United States Patent [19]

Handa et al.

[11] Patent Number: 4,799,565

[45] Date of Patent: Jan. 24, 1989

[54] FUEL SUPPLY SYSTEM FOR OFF-ROAD VEHICLE

[75] Inventors: Akio Handa; Eiji Hosoya; Kousei Mizumoto; Makoto Ishiwatari; Takanori Okuma, all of Saitama, Japan

[73] Assignee: Honda Giken Kogyo Kabushiki Kaisha, Tokyo, Japan

[21] Appl. No.: 113,236

[22] Filed: Oct. 23, 1987

[30] Foreign Application Priority Data

| Oct. 23, 1986 | [JP] | Japan | 61-162962[U] |
| Oct. 24, 1986 | [JP] | Japan | 61-253348 |
| Oct. 24, 1986 | [JP] | Japan | 61-253349 |
| Oct. 27, 1986 | [JP] | Japan | 61-255051 |
| Oct. 27, 1986 | [JP] | Japan | 61-255052 |

[51] Int. Cl.$^4$ .............................. B60K 15/02
[52] U.S. Cl. ..................... 180/69.4; 70/455; 180/296; 180/309; 180/312; 280/834
[58] Field of Search ............. 180/215, 217, 210, 311, 180/312, 219, 225, 296, 309, 69.4; 280/5 A; 220/210; 70/165, 455

[56] References Cited

U.S. PATENT DOCUMENTS

| 3,642,086 | 2/1972 | Andrews | 280/5 A |
| 3,650,344 | 3/1972 | Plessinger et al. | 180/217 |
| 3,908,778 | 9/1975 | Sien | 180/296 X |
| 4,223,899 | 9/1980 | Krieger | 280/5 A |
| 4,231,240 | 11/1980 | Fujita et al. | 220/210 |
| 4,535,869 | 8/1985 | Tsutsumikoshi | 180/311 |
| 4,641,854 | 2/1987 | Masuda et al. | 280/701 |
| 4,653,762 | 3/1987 | Nakamura et al. | 280/5 A |

FOREIGN PATENT DOCUMENTS

| 51-109519 | 9/1976 | Japan . |
| 53-17532 | 5/1978 | Japan . |
| 54-19606 | 7/1979 | Japan . |
| 60-134042 | 9/1985 | Japan . |

Primary Examiner—John A. Pekar
Attorney, Agent, or Firm—Irving M. Weiner; Joseph P. Carrier; Pamela S. Burt

[57] ABSTRACT

A fuel supply system in an off-road vehicle including front and rear wheels having wide tires, respectively, an engine mounted on a rear portion of a vehicle frame, and an exhaust pipe extending from the engine and disposed on one side of the engine transversely of the vehicle frame. The fuel system comprises a fuel tank assembly disposed on the other side of the engine transversely of the vehicle frame, and an air cleaner case disposed rearwardly of the fuel tank assembly. The vehicle frame comprises a plurality of welded pipe members. The fuel tank assembly has an outer peripheral flange supported at plural locations thereon by at least two of the pipe members of the vehicle frame. The fuel tank assembly has a cap for detachably closing a fuel inlet hole, the cap including a resiliently biased cover swingably mounted on an upper surface for covering a key slot from above. The fuel tank assembly comprises a main fuel tank disposed in a relatively low position and an auxiliary fuel tank disposed at a level higher than the main fuel tank and higher than a carburetor of the engine. The fuel supply system further includes a pump disposed in a fuel line interconnecting the main fuel tank and the auxiliary fuel tank. The fuel tank assembly has on a front wall thereof a cock positioned directly behind a driver's seat disposed substantially centrally in the longitudinal and transverse directions of the vehicle frame.

13 Claims, 9 Drawing Sheets

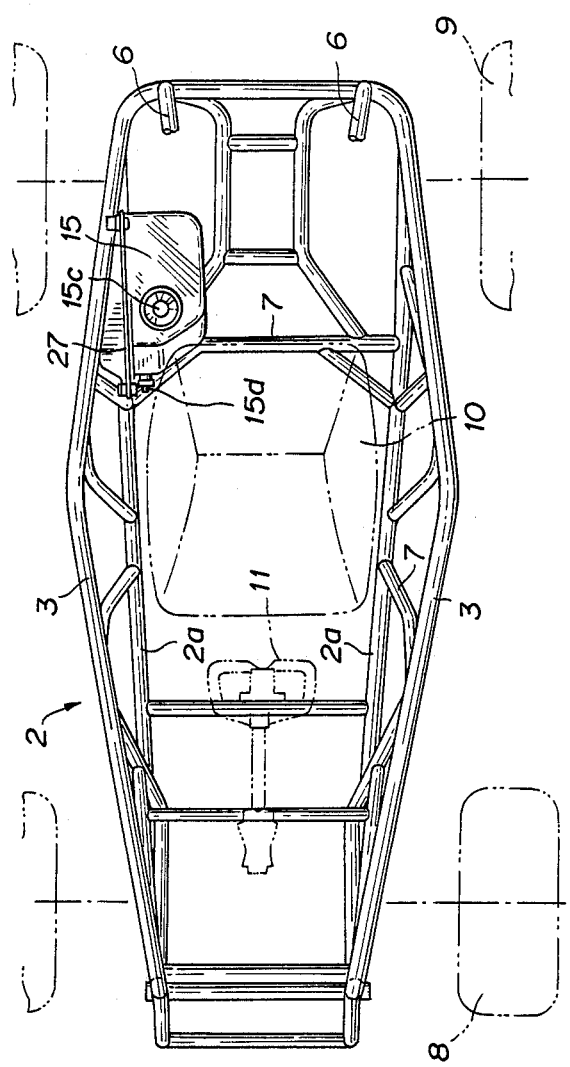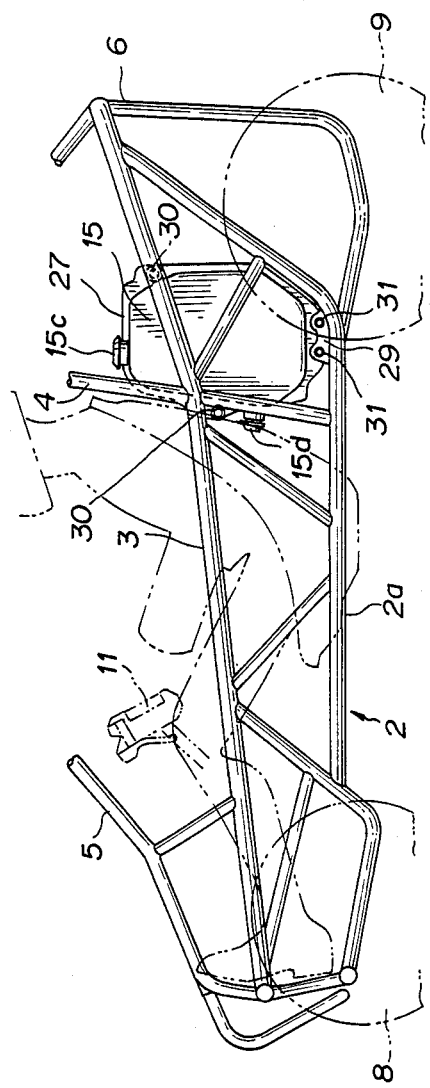
FIG.6
FIG.7

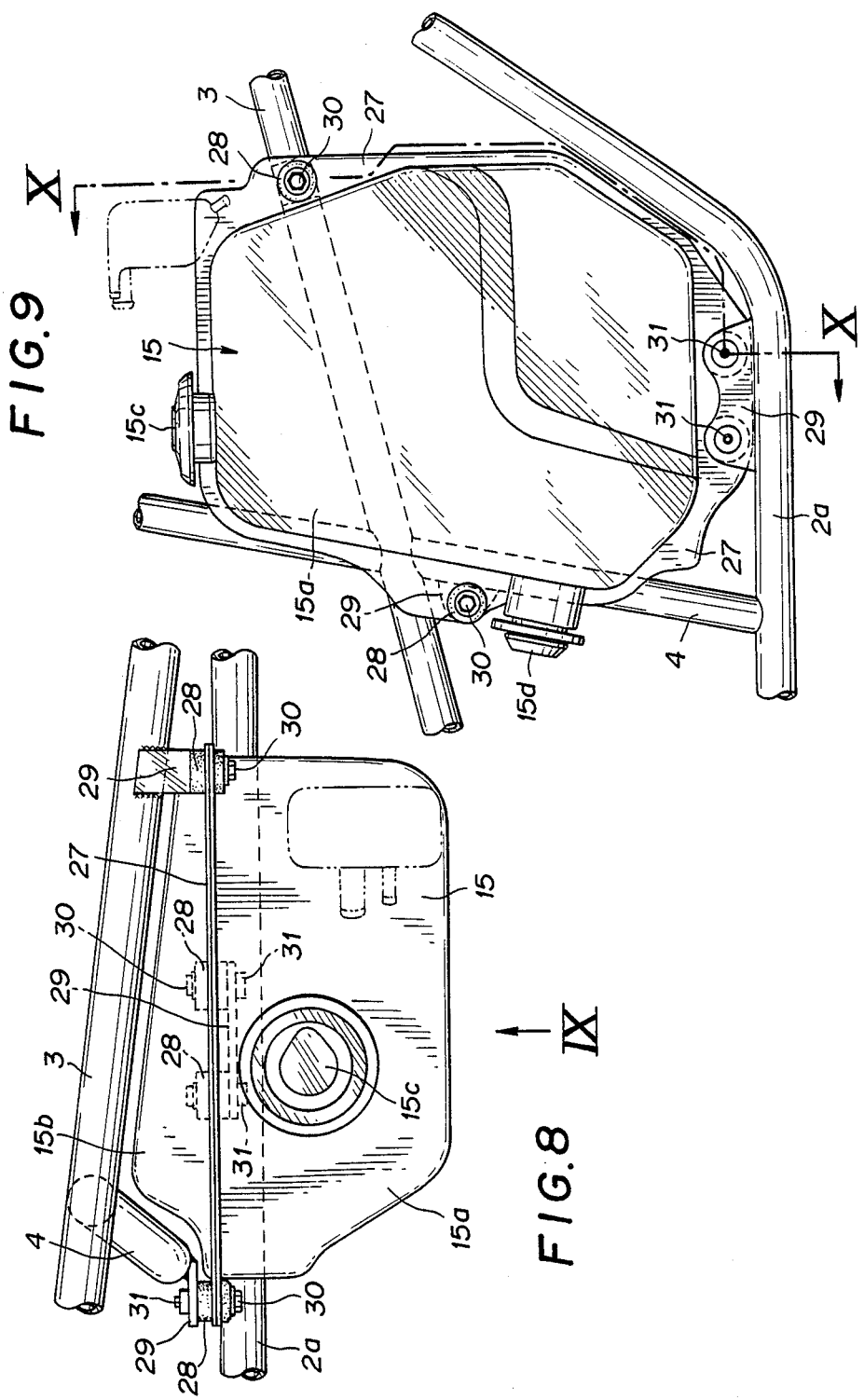

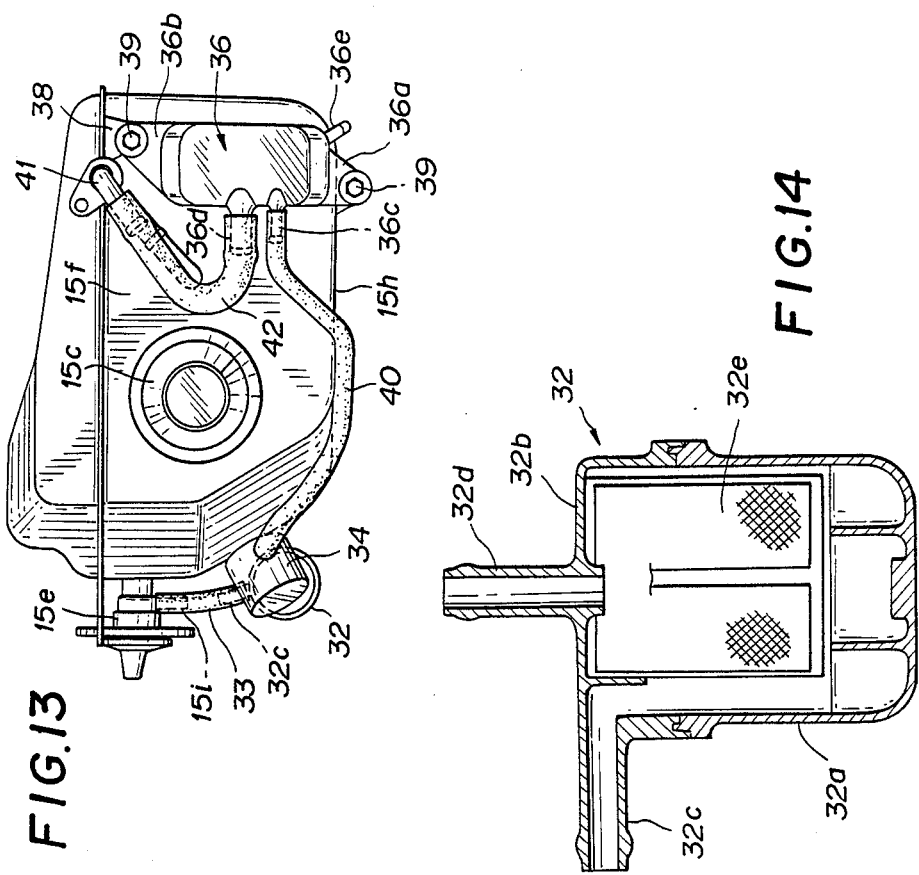

FUEL SUPPLY SYSTEM FOR OFF-ROAD VEHICLE

BACKGROUND OF THE INVENTION

1. Field of the Invention

The present invention relates to a fuel supply system, and more particularly to a fuel supply system for an off-road vehicle such as a four-wheeled buggy having wide tires on front and rear wheels for running over rough terrain such as prairies and deserts.

2. Description of the Relevant Art

In recent years, there are manufactured and used off-road vehicles such as four-wheeled buggies having wide tires on front and rear wheels for travel over rough terrain such as prairies and deserts. One example of such off-road vehicle is disclosed in Japanese Utility Model Publication No. 54-19606 published July 19, 1979 which was filed by the assignee of the present application. The disclosed off-road vehicle comprises a vehicle frame, a driver's seat disposed centrally in the frame, an engine mounted on the frame between the driver's seat and a rear wheel axle, a fuel tank and a transmission case which are relativley heavy and disposed rearwardly of the engine on respective sides of the vehicle frame. A carburetor is located behind the engine. The heavy components such as the engine, the fuel tank, and the transmission case have their centers of gravity positioned near the rear wheel axle.

Since the fuel tank is located rearwardly of the engine on one side of the frame and the carburetor behind the engine, an air cleaner case is disposed rearwardly of the engine parallel to the fuel tank across the vehicle frame. Therefore, the air cleaner case is normally situated closely to an exhaust pipe extending rearwardly from the engine, and hence is susceptible to the heat of the exhaust pipe. The connecting pipe between the air cleaner and the carburetor is also disposed rearwardly of the engine. Accordingly, many pipes or tubes are closely packed in the space rearward of the engine. As a result, air circulation for cooling the engine and the radiator is poor. The volumes or capacities of the fuel tank and the air cleaner are limited by their parallel arrangement transversely across the vehicle frame.

Many general off-road vehicles have a vehicle frame composed of a pluraity of mutually welded pipes. The engine, the fuel tank, and other parts are supported on such a vehicle frame of welded piping. Particularly, the fuel tank is often suspended from or disposed astride of a pipe through a skid plate or the like. The pipe by which the fuel tank is thus supported is therefore required to be higher is ridigity than the other pipes of the vehicle frame. It is necessary that the fuel tank supporting pipe be of an increased wall thickness or of a reduced length. Consequently, the vehicle frame is increased in weight or can be designed only with limited freedom or flexibility.

On four-wheeled off-road vehicles of the type described above, and two- and three-wheeled off-road motorcycles, the fuel inlet port of the fuel tank is generally closed by a removable cap which has a lock mechanism for locking the cap to the fuel tank. The cap has a key slot defined in its upper surface for insertion therein of a key for operating and releasing the lock mechanism, and a key cover for selectively closing the key slot.

The key cover is usually disposed such that it rotates about an axis normal to a plane containing the upper surface in which the key slot is defined. This key cover arrangement often results in the tendency that after the fuel tank has been refilled, the cap may be attached to the fuel tank again while the key slot is not covered by the key cover. As a consequence, water droplets, muddy water, dust, and/or other foreign matter may be deposited in or enter the key slot, and the key slot may be clogged by the unwanted deposit. One solution is to use a spring for urging the key cover to the key slot closing position. The spring must produce a relatively large spring force to slide the key cover over the key slot. When opening the key cover, therefore, a large force is required to rotate the key cover against the resiliency of the spring. Once foreign matter such as small stones is caught between the key cover and the key slot, the key cover gets stuck and will not rotate in either direction.

The off-road vehicles run over rough terrain such as prairies and deserts at high temperature during summer. As described above, the fuel tank is disposed rearwardly of and closely to the engine, and is directly exposed to sunlight as it is not covered by a cover. Therefore, the fuel tank is subject to hot air over the rough terrain, the heat of the engine, and strong sunshine. If an off-road vehicle employs a pressure-feed fuel system having a fuel pump, as with two-wheeled, on-road motorcycles, then vapor lock is apt to occur in the fuel line from the fuel tank to the carburetor. If a gravity-feed fuel system is incorporated in an off-road vehicle, on the other hand, such a vapor lock condition in the fuel line is avoided because the fuel tank is positioned more or less higher than the carburetor. The gravity-feed fuel system, however, does not have a large fuel supply capability. With the fuel tank in an elevated position, the center of gravity of the vehicle as a whole is also elevated, which is not preferable for off-road vehicles and is disadvantageous from the standpoint of layout of the fuel tank.

On four-wheeled off-road vehicles, a fuel shutoff valve is disposed in the fuel line in the vicinity of the fuel tank, as with two-wheeld on-road motorcycles. Inasmuch as the fuel tank is disposed rearwardly of the engine behind the driver's seat, as described above, it is difficult for the driver seated on the driver's seat to operate the fuel shutoff valve.

It is an object of the present invention to provide an off-road vehicles which will overcome the aforesaid problems of the conventional off-road vehicles.

SUMMARY OF THE INVENTION

It is an object of the present invention to provide a fuel supply system for an off-road vehicle, which can prevent the air cleaner case from being thermally influenced by the exhaust pipe and can maintain good air circulation for cooling the engine, without placing limitations on the volumes or capacities of the fuel tank and the air cleaner case.

Another object of the present invention is to provide a fuel supply system for an off-road vehicle, which can support a fuel tank without increasing the weight of frame components and limiting the freedom or flexibility of designing a frame configuration.

Still another objection of the present invention is to provide a fuel supply system for an off-road vehicle, which includes a fuel tank having a cap that can effectively prevent a key cover from being left in a key slot opening position and that permits foreign matter to be easily removed from the key cover and the key slot.

A further object of the present invention is to provide a fuel supply system for an off-road vehicle, which comprises a pressure-feed fuel system employing a fuel pump having a relatively large fuel supply capability, but effectively prevents vapor lock from being developed in the fuel line, prevents the vehicle from having an elevated center of gravity, and is advantageous from the standpoint of layout of the fuel tank.

A still further object of the present invention is to provide a fuel supply system for an off-road vehicle, which allows a driver seated on the driver's seat to easily operate a fuel shutoff valve.

To accomplish the above objects, there is provided a fuel supply system in an off-road vehicle including a vehicle frame, front and rear wheels mounted on front and rear portions of the vehicle frame and having wide tires, respectively, an engine mounted on the rear portion of the vehicle frame, and an exhaust pipe extending from the engine and disposed on one side of the engine transversely of the vehicle frame, the fuel supply system comprising a fuel tank assembly disposed on the other side of the engine transversely of the vehicle frame, and an air cleaner case disposed rearwardly of the fuel tank assembly.

The vehicle frame comprises a plurality of welded pipe members, the fuel tank assembly comprising two tank members with respective flanges seam-welded to each other into an outer peripheral flange, the outer peripheral flange being supported at plural locations thereon by at least two of the pipe members of the vehicle frame.

The fuel tank assembly has a fuel inlet hole defined in a wall thereof and a cap for detachably closing the fuel inlet. The cap has a lock mechanism for locking the cap to the fuel tank assembly, an upper surface defining therein a key slot for insertion therein of a key for actuating and releasing the lock mechanism, a cover swingably mounted on the upper surface of the cap for covering the key slot from above, and urging means for normally urging the cover resiliently into a position in which the cover covers the key slot.

The fuel tank assembly comprises a main fuel tank disposed in a relatively low position in the vehicle frame and internally kept at a substantially atmospheric pressure level, and an auxiliary fuel tank disposed at a position higher than the main fuel tank and higher than a carburetor of the engine. The fuel supply system further includes a fuel line interconnecting the main fuel tank, the auxiliary fuel tank and a carburetor of the engine, and a pump disposed in the fuel line interconnecting the main fuel tank and the auxiliary fuel tank for feeding fuel under pressure from the main fuel tank to the auxiliary fuel tank. The above arrangement is such that the fuel fed from the main fuel tank to the auxiliary fuel tank by the pump is then fed by gravity from the auxiliary fuel tank to the carburetor.

The vehicle frame comprises a plurality of pipe members, while the vehicle further includes a driver's seat disposed substantially centrally in the transverse and longitudinal directions of the vehicle frame. The fuel tank assembly is disposed rearwardly of the driver's seat and has on a front wall thereof a cock positioned directly behind the driver's seat for operating a fuel shutoff valve in the fuel tank assembly.

The above and further objects, details and advantages of the present invention will become apparent from the following detailed description of a preferred embodiment thereof, when read in conjunction with the accompanying drawings.

BRIEF DESCRIPTION OF THE DRAWINGS

FIGS. 6 and 7 are plan and side elevational views, respectively, of a vehicle frame of the off-road vehicle of FIG. 1;

FIG. 8 is an enlarged fragmentary plan view of a fuel tank in the fuel supply system;

FIG. 9 is a side elevational view taken along line IX of FIG. 8;

FIG. 12 is an elevational view taken along line XII—XII of FIG. 11;

FIG. 13 is a plan view taken along line XIII—XIII of FIG. 11;

FIG. 14 is a cross-sectional view of a fuel filter in the fuel supply system;

DETAILED DESCRIPTION OF THE PREFERRED EMBODIMENT

Figure 1:
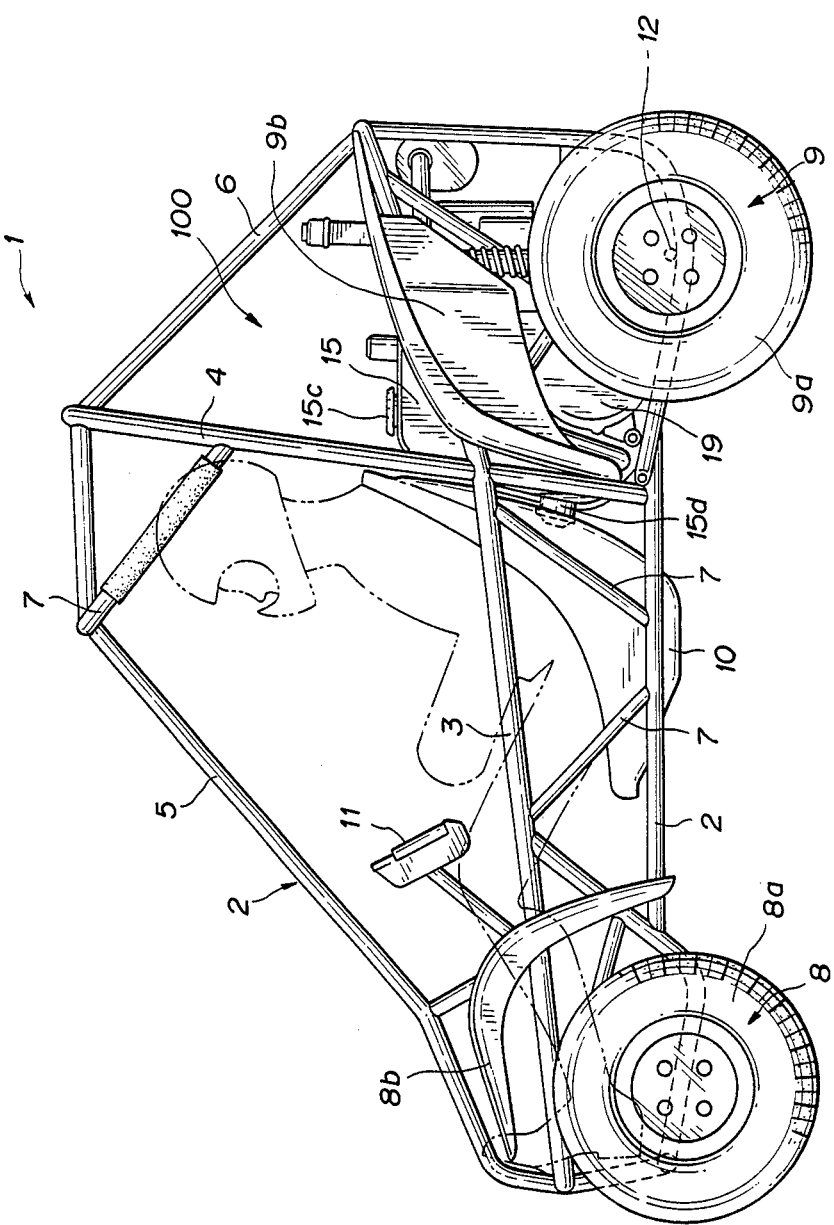
FIG. 1 is a side elevational view of an off-road vehicle including a fuel supply system according to a preferred embodiment of the present invention.
Figure 2:
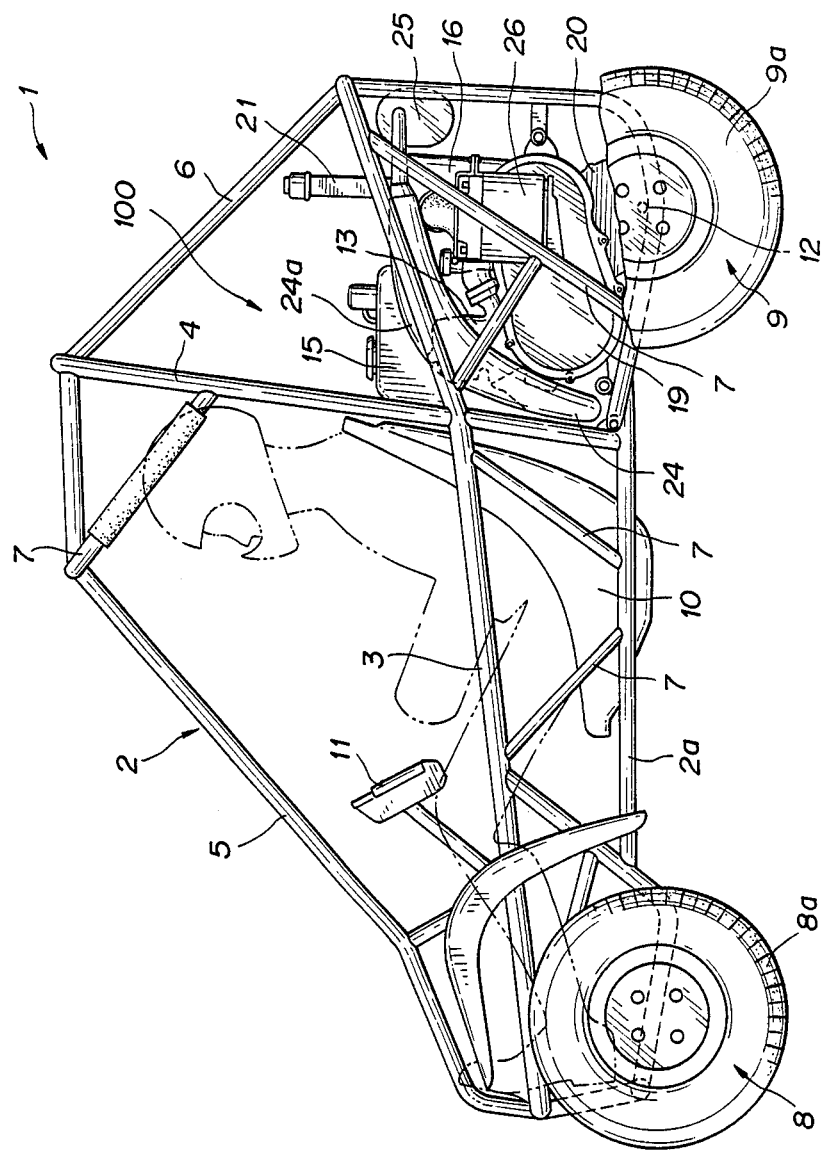
FIG. 2 is a view similar to FIG. 1, but with some parts shown fragmentarily and omitted from illustration.

As shown in FIGS. 1 and 2, an off-road vehicle 1 includes a fuel supply system 100 according to a preferred embodiment of the present invention, the off-road vehicle 1 having a vehicle frame 2 composed of pipes. The vehicle frame 2 comprises a pair of laterally spaced lower frames 2a extending longitudinally on respective sides of the vehicle 1, a pair of laterally spaced side frames 3 disposed upwardly of and extending substantially parallel to the lower frames 2a, a pair of laterally spaced auxiliary pipe members 4 extending vertically and welded to the lower frames 2a and the side frames 3 at a position slightly rearwardly of the vehicle center, a pair of laterally spaced upper roll bars 5 having front ends welded to front portions, respectively, of the lower frames 2a and rear ends welded to the upper ends, respectively, of the auxiliary pipe members 4, and a pair of laterally spaced rear roll bars 6 having lower ends, intermediate portions, and upper ends welded to the rear ends of the lower frames 2a, the side frames 3, and the upper roll bars 5, respectively. Cross members 7 are welded to and extend between the frames 2a, 3 and the roll bars 5, 6 at suitable positions. The vehicle frame 2 is constructed of these pipe members 2a, 3, 4, 5, 6, 7 welded together in the form of a cage.

Two front wheels 8 and two rear wheels 9 are rotatably supported on front and rear portions of the vehicle frame 2 by respective trailing-arm suspension mechanisms. The front wheels 8 are operatively coupled to a steering handle 11 having rod-shaped side grips by a steering mechanism (not shown) so that the front wheels 8 will be steered by the steering handle 11. Wide tires 8a, 9a are mounted on the front and rear wheels 8, 9, respectively. The rear wheels 9 are driven by a drive axle 12. Fenders 8b, 9b are attached to the vehicle frame 2 over the front and rear wheels 8, 9, respectively.

A driver's seat 10 is mounted on the lower frames 2a substantially centrally in the vehicle 1 in its longitudinal and transverse directions. An engine 13 and its associated components are disposed in a space surrounded and defined by the lower frames 2a, the side frames 3, the auxiliary pipes 4, and the rear roll bars 6 rearwardly of the driver's seat 10.

Figure 4:
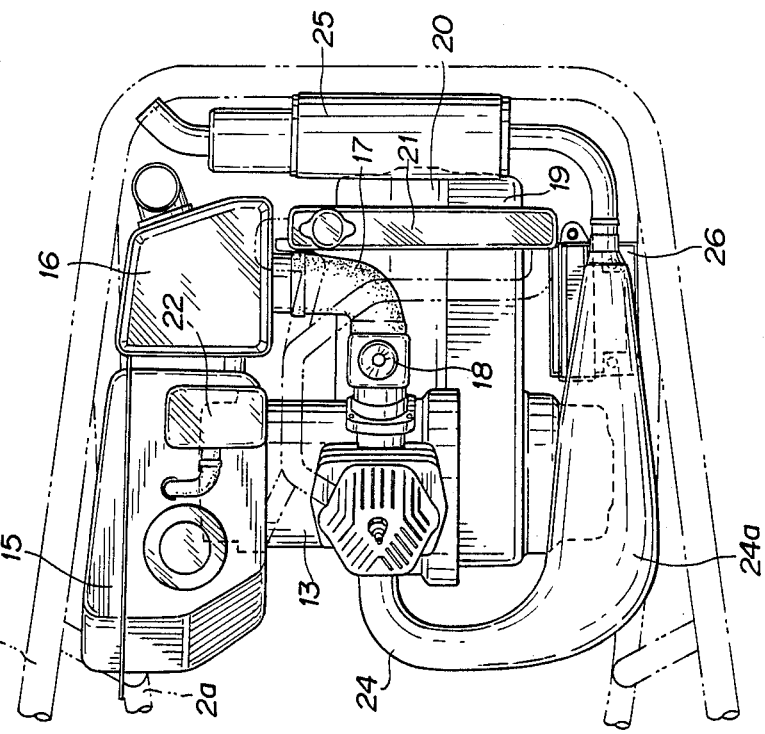
FIGS. 3, 4, and 5 are enlarged side elevational, plan, and rear views, respectively, of an engine and associated components of the off-road vehicle shown in FIG. 1.
Figure 3:
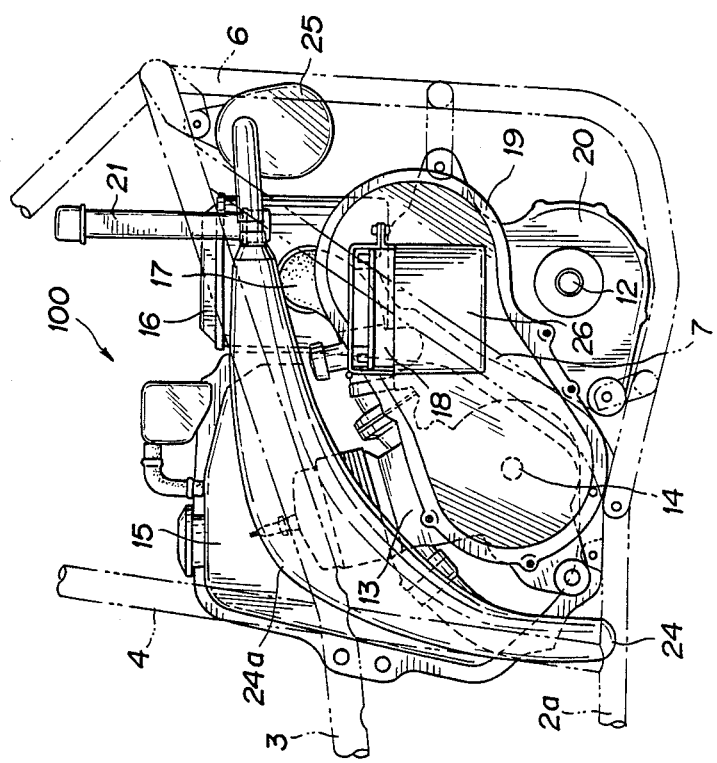
Figure 5:
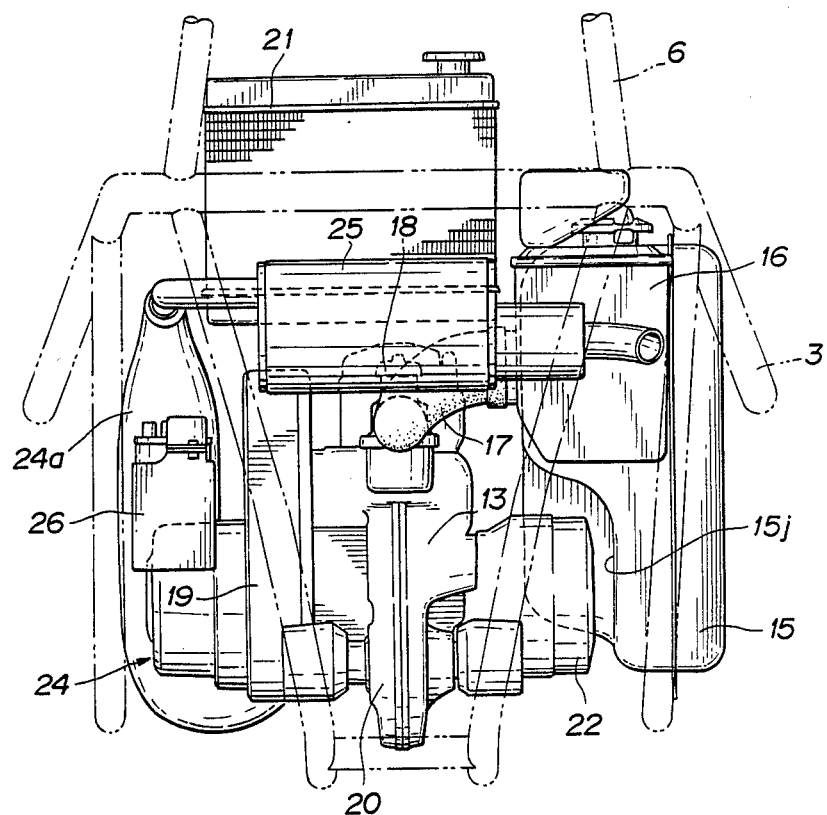

As illustrated in FIGS. 3, 4, and 5, the engine 13 is disposed in front of the drive axle 12 and has a crankshaft 14 extending parallel to the drive axle 12 in the transverse direction of the vehicle 1. As viewed from behind the vehicle 1, a main fuel tank 15 as part of the fuel supply system 100 is disposed on the righthand side of the engine 13, and an air cleaner case 16 is located rearwardly of the fuel tank 15. The fuel tank 15 and the air cleaner case 16 are juxtaposed in the longitudinal direction of the vehicle 1. The fuel tank 15 is positioned at substantially the same level as that of the engine 13 and slightly forwardly of the engine 13. Therefore, the fuel tank 15 is disposed in a relatively low position. A container-connecting tube 17 extends from a transversely inner surface of the air cleaner case 16 to a carburetor 18 located behind the engine 13. On the lefthand side of the engine 13, there is disposed a pulley case 19 housing a pulley (not shown) for transmitting engine power. A transmission case 20 is disposed behind the engine 13, the transmission case 20 housing a transmission (not shown) for transmitting, at varied speeds, engine power from the pulley to the drive axle 12. Above the transmission case 20, there is disposed a radiator 21 projecting upwardly from the engine 13 for efficiently collecting cooling air while the vehicle 1 is traveling.

The fuel tank 15 has a recess 15j defined in its inner side and accommodating therein a starter pulley case 22 mounted on a lower portion of the engine 13 and housing therein a recoil starter pulley (not shown) coaxially with the crankshaft 14.

A relatively small-diameter exhaust pipe 24 extends forwardly from a front surface of the engine 13. The exhaust pipe 14 is first bent to the left and then bent rearwardly and obliquely upwardly into a larger-diameter expansion chamber 24a. The expansion chamber 24a has a rear end of a progressively smaller diameter which is bent to the right and connected to a lefthand exhaust inlet (not shown) of a muffler 25 disposed behind a lower portion of the radiator 21 in the transverse direction of the vehicle 1. The muffler 25 is lower in position than the radiator 21. A relatively heavy battery 26 is supported by a cross member 7 located on the lefthand side of the vehicle 1 and is positioned downwardly of a rear portion of the expansion chamber 24a and forwardly of the drive axle 2.

Figures 10, 11:
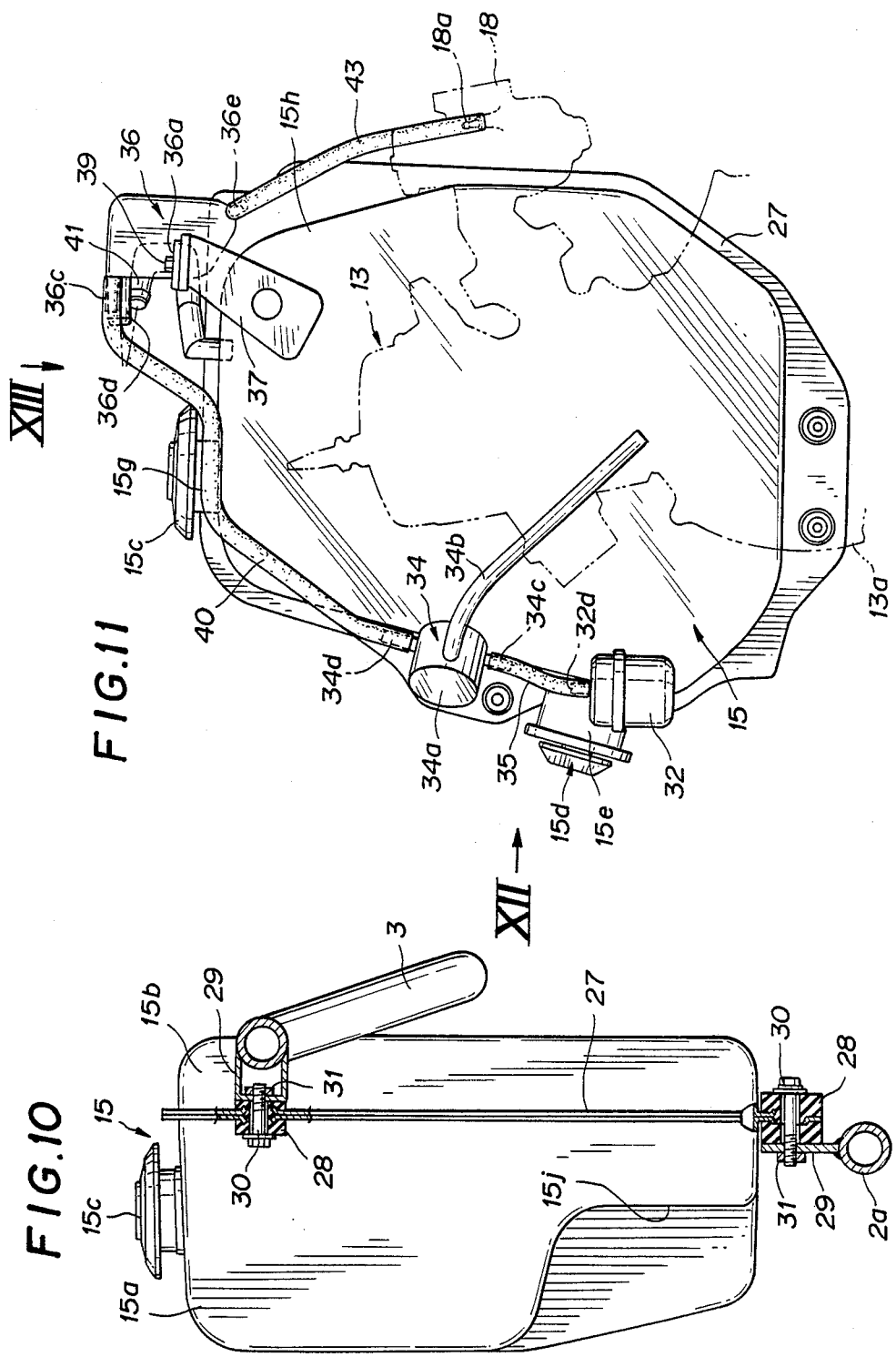
FIG. 10 is a cross-sectional view taken along line X—X of FIG. 9.
FIG. 11 is a side elevational view of the fuel tank.

As illustrated in FIGS. 8 through 10, the main fuel tank 15 comprises tank members 15a, 15b joined to each other by seam-welding their flanges into a continuous flange 27 extending fully around the fuel tank 15. A cap 15c and a cock 15d are mounted respectively on upper and front walls of the lefthand tank member 15a. As shown in FIGS. 1, 6, and 7, with the fuel tank 15 mounted on the frame 2, the fuel tank 15, particularly the cock 15d on its front wall, is positioned directly behind the driver's seat 10. Therefore, the right hand of the driver as seated on the seat 10 can reach the cock 15d, and the cock 15d can be easily operated by the driver. When the cock 15d is operated, a shutoff valve (not shown) in the fuel tank 15 is turned on or off. On the righthand side of the vehicle 1, the fuel tank 15 is supported by the pipe members 2a, 3, 4 of the vehicle frame 2. More specifically, the flange 27 of the fuel tank 15 has openings defined in a front central portion, a lower central portion, and a rear upper portion thereof, with annular rubber members 28 fitted in the respective openings. On the righthand side of the vehicle 1, the lower frame 2a, the side frame 3, and the auxiliary pipe member 4 have brackets 29 having respective bolt insertion holes. The fuel tank 15 is fastened to the vehicle frame 2 by bolts 30 extending through the bolt insertion holes in the brackets 29 and the rubber members 28 and also by nuts 31 threaded over the bolts 30.

As shown in FIGS. 11 through 14, the fuel tank 15 is disposed slightly forwardly of the engine 13. The fuel tank 15 is of a vertically elongate shape with a lower portion positioned at substantially the same level as that of a lower portion of a crankcase 13a of the engine 13. the engine 13 and the fuel tank 15 are disposed in relatively low positions. A fuel filter 32 is located adjacent to the cock 15d on the front wall of the fuel tank 15.

As shown in FIG. 14, the fuel filter 32 has a container-like casing 32a and a cover 32b mounted on the casing 32a and having a fuel inlet 32c on a circumferential portion thereof. A vertical fuel outlet 32d is mounted centrally on the cover 32b. The casing 32a and the cover 32b jointly define an inner space therein in which a filter element 32e of nylon mesh or the like is mounted. Fuel flows from the fuel inlet 32c into the casing 32a, then is filtered by the filter element 32e, and finally drawn out of the fuel outlet 32d by a pump 34 (described below). The fuel inlet 32c is connected by a tube 33 to a fuel supply outlet 15i on a body 15e of the cock 15d.

The pump 34, which comprises a diaphragm-operated vacuum pump, is disposed above the fuel filter 32. The pump 34 has a pump body 34a to which there is connected a pipe 34b coupled to an intake vacuum passage or the like in the engine 13 for introducing a vacuum pressure. The pump 34 also has an inlet pipe 34c joined to the fuel outlet 32d by a tube 35.

The upper wall 15f of the fuel tank 15 has a fuel inlet hole (not shown) defined in a lefthand portion thereof. The cap 15c has a body 15g fitted in the fuel inlet hole. The cap 15c has a vent hole (not shown) for keeping the internal pressure of the fuel tank 15 at an atmospheric pressure level. An auxiliary fuel tank 36 which is of a smaller capacity than the main fuel tank 15 is disposed on a rear portion of the upper wall 15f of the fuel tank 15. The auxiliary fuel tank 36 is positionally higher than the main fuel tank 15 and also the carburetor 18. The auxiliary fuel tank 36 has flanges 36a, 36b projecting laterally from opposite sides thereof. The flanges 36a, 36b are fixedly connected by bolts 39, respectively, to a stay 37 on transversely inner side wall 15h of the main fuel tank 15 and a stay 38 on an upper portion of the surrounding flange 27 of the main fuel tank 15. Thus, the auxiliary fuel tank 36 is attached to the main fuel tank 15. The auxiliary fuel tank 36 has a projecting fuel inlet pipe 36c coupled to an outlet pipe 34d of the fuel pump 34. The auxiliary fuel tank 36 also has an overflow outlet 36d disposed adjacent to and below the fuel inlet pipe 36c. The overflow outlet 36d is coupled by a tube 42 to a return pipe 41 projecting from the upper wall of the main fuel tank 15 in communication with the interior of the fuel tank 15. The return pipe 41 has a check valve 44 for allowing fuel to flow only from the auxiliary fuel tank 36 to the main fuel tank 15. Even when the vehicle 1 is laid down for maintenance or servicing, fuel is prevented from flowing from the main fuel tank 15 to the auxiliary fuel tank 36.

The bottom of the auxiliary fuel tank 36 has a fuel outlet 36e directed downwardly. The carburetor 18 is disposed below the fuel outlet 36e which is held by a tube 43 in communication with a fuel inlet 18a communicating with the float chamber of the carburetor 18.

The filter 32, the pump 34, the auxiliary fuel tank 36, the carburetor 18, and other associated parts jointly constitute a pressure-feed fuel system. The components denoted by the reference numerals 33, 32, 35, 34, 40, 36, 43 jointly provide a fuel, such as from the fuel tank 15, to the carburetor 18. In response to operation of the pump 34, fuel in the fuel tank 15 is drawn through the shutoff valve (not shown), the tube 33, and the filter 32 into the pump 34, from which the fuel is supplied via the tube 40 into the auxiliary fuel tank 36. The fuel that is supplied to the auxiliary fuel tank 36 is gravity-fed via the tube 43 to the carburetor 18. A fuel overflow from the auxiliary fuel tank 36 returns from the overflow outlet 36d via the tube 42, the return pipe 41, and the check valve 44 back into the main fuel tank 15. Since the cap 15c of the main fuel tank 15 has the vent mechanism (not shown), the internal pressure in the fuel tank 15 is kept at an atmospheric pressure level even when the temperature in the fuel tank 15 rises due to an increase in the ambient temperature.

The vacuum pump 34 may be replaced with a pump of any desired design.

Figure 16:
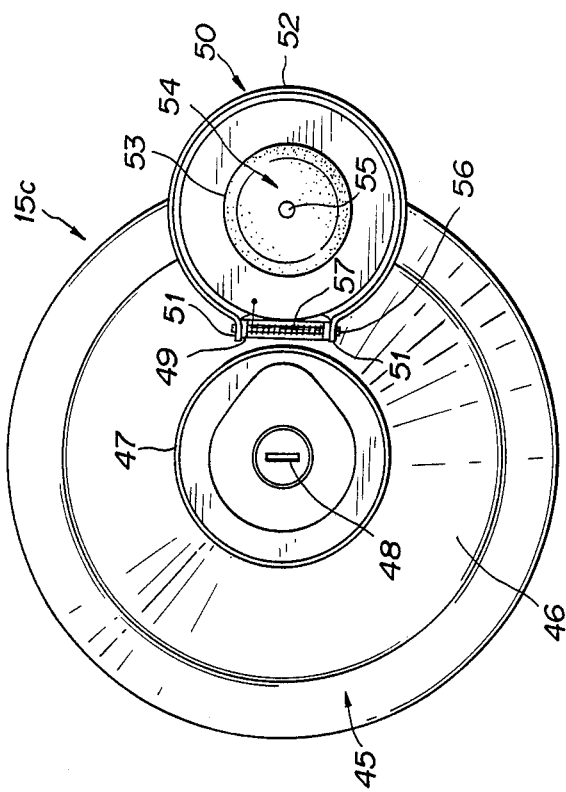
FIGS. 15 and 16 are partly fragmentary side elevational and plan views, respectively, of a cap of the fuel tank.
Figure 15:
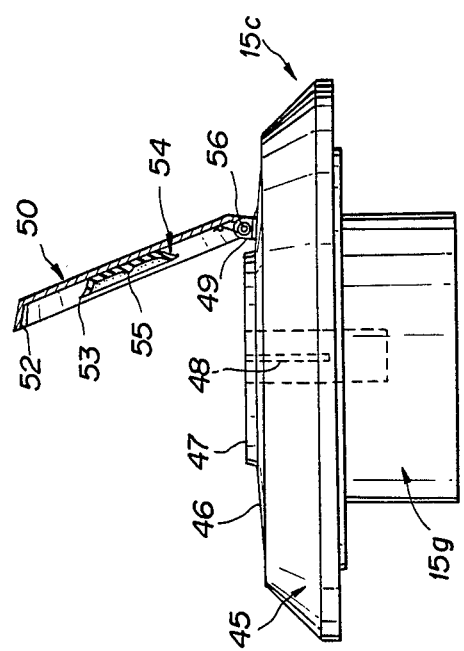

FIGS. 15 and 16 illustrate the cap 15c of the main fuel tank 15 in detail.

The body 15g of the cap 15c is fitted in the fuel inlet hole (not shown) defined in the upper wall 15f of the main fuel tank 15. The cap 15c has a frustoconical flange 45 mounted on the upper end of the body 15g and having a sufficiently larger diameter than that of the fuel inlet hole of the main fuel tank 15. The body 15g has a lock mechanism (not shown) disposed therein for locking the body 15g to the tank 15.

A ring-shaped ridge 47 is formed on a central portion of the upper surface 46 of the flange 45. A key slot 48 which is open upwardly is vertically defined in the upper surface 46 centrally within the ring-shaped ridge 47 for insertion therein of a key (not shown) that actuates and releases the lock mechanism. Slightly outside of the ring-shaped ridge 47, a narrow channel-shaped bracket 49 is attached to the upper surface 46 of the flange 45. The bracket 49 has opposite upward projections or arms between which there is supported a support shaft 56 which supports at its outer ends a pair of projections or arms 51 extending radially outwardly from an outer peripheral edge of a downwardly directed circular saucer-shaped cover 50. The cover 50 is swingable about the support shaft 56 toward and away from the flange 45 for covering and opening the key slot 48. Thus, the cover 50 can be swung in a direction away from the key slot 48. The cover 50 has a small circular flange 52 projecting downwardly from the outer peripheral edge thereof. When the cover 50 is pivoted counterclockwise (FIG. 15) about the support shaft 56 until the recumbent downward limit position is reached to fully cover the key slot 48, the outer peripheral flange 52 fits over the ring-shaped ridge 47 on the flange 45. A torsion coil spring 57 is disposed around the support shaft 56 for normally urging the cover 50 to turn counterclockwise (FIG. 15), the coil spring 57 having opposite ends engaging the cover 50 and the flange 45, respectively. The cover 50 is therefore normally biased resiliently to its recumbent position on the flange 45 to close the key slot 48. A seal 54 is attached centrally to the lower surface of the cover 50 for protecting the key slot 48 when the cover 50 is closed. The seal 54 is in the form of a downwardly directed circular saucer smaller in diameter than the flange 52 and has an annular lip 53 on its outer peripheral edge. The seal 54 also as a central convexity 55 which is elastically held against the key slot 48 when the cover 50 is closed. The lip 53 is of a diameter slightly larger than the length of the open end of the key slot 48, so that the lip 53 will be sealingly held against the upper surface of the flange 45 around the key slot 48.

FIG. 15 shows the cover 50 which is lifted to permit a key (not shown) to be inserted into the key slot 48. FIG. 16 illustrates a position to which the cover 50 has been further opened from the cover position of FIG. 15. Although not shown, the cover 50 is normally closed or in its recumbent position under the bias of the spring 57. When the cover 50 is closed, the key slot 48 is protected by the seal 54 and the cover 50. For inserting the key into the key slot 48 to release the lock mechanism, the cover 50 is lifted to the position of FIG. 15 against the bias of the spring 57, and then the lock mechanism is unlocked. After fuel has been supplied, the key is pulled out of the key slot 48, and the cover 50 is automatically turned counterclockwise in FIG. 15 under the resiliency of the spring 57. Therefore, the cover 50 is closed and the key slot 48 is protected by the seal 54 and the cover 50.

With the above arrangement of the present invention, the fuel tank 15 is disposed on one side of the engine 13, and the exhaust pipe 24, 24a is positioned on the other side of the engine 13, with the air cleaner 16 behind the engine 13. Therefore, the fuel tank 15 and the air cleaner 16 of the fuel supply system 100 are substantially free from the heat of the exhaust pipe 24, 24a. Since the fuel tank 15 and the air cleaner 16 are juxtaposed in the longitudinal direction of the vehicle 1, their volumes or capacities are not virtually limited. Air circulation for cooling the engine 13 and the radiator 21 is well maintained since other vehicle components, including frame tubes, are not closely packed behind the engine 13. Because the heavy components such as the fuel tank 15 and the battery 26 are disposed forwardly of the drive axle 12, the center of gravity of the vehicle 1 is located as closely to the center of the vehicle frame 2 as possible, with the result that the vehicle 1 has good stability. Such vehicle stability can be increased by increasing the capacity of the fuel tank 15. The radiator 21 is disposed between the engine 13 and the muffler 25 in the longitudinal direction of the vehicle 1, between the exhaust pipe 24a and the air cleaner case 16 in the transverse direction of the vehicle 1, and upwardly of the engine 13 and the muffler 25 in the vertical direction. Consequently, air circulation for cooling the radiator 21 is highly improved.

The fuel tank 15 is supported at plural locations on the flange 27 by at least two frame pipe members 2a, 3, 4 of the vehicle frame 2. The weight of the fuel tank 15 is distributed to the frame pipe members 2a, 3, 4. Therefore, it is not necessary to increase the rigidity of a particular frame pipe member. As a result, efforts to increase the weight, or reduce the length, of a particular vehicle frame component are not needed, and the freedom or flexibility of designing the configuration of the vehicle frame 2 is not limited.

The key cover 50 is resiliently urged by the spring 57 to cove the key slot 48 from above. Unlike a cover that is angularly movable in a plane containing the upper surface in which a key slot is defined, the cover 50 is effectively prevented from being left in a position in which the key slot 48 is open. As a consequence, water droplets, muddy water, dust, and/or other foreign matter are prevented from entering the key slot 48 while the vehicle 1 is running over rough terrain. Since the cover 50 is swingable in a direction away from the key slot 48, foreign matter such as small stones caught between the cover 50 and the key slot 48 can easily be removed. The cover 50 which is movable between the lifted and recumbent positions allows the seal 54 to be attached to the reverse side of the cover 50 for sealingly engaging the area around the key slot 48. Accordingly, the key slot 48 is reliably protected by the outer flange 52 of the cover 50 and the lip 53 of the seal 54. Thus, the key slot 48 is highly effectively sealed by the cover 50.

The center of gravity of the vehicle 1 remains relatively low since the relatively heavy fuel tank 15 is disposed in a lower position. Fuel in the fuel tank 15 is forcibly fed by the fuel tank 34 to the higher auxiliary pump 36, and then gravity-fed through the tube 43 into the carburetor 18. Therefore, air bubbles which may be present in the fuel can be separated from the fuel in the auxiliary tank 36. Consequently, no vapor lock takes place in the tube 43, and the carburetor 18 is smoothly and reliably fed with fuel under constant pressure. This can be achieved by a simple arrangement and a minimum component addition such that the auxiliary tank 36 of small capacity is additionally disposed on the main tank 15 of relatively large capacity at a level higher than the carburetor 18. Even when the interior of the fuel tank 5 is affected by the ambient air temperature or the heat of the engine 13, and hence the temperature in the fuel tank 5 is caused to rise, the fuel supplied by the pressure-feed fuel system of the invention is not subjected to vapor lock and can be smoothly delivered to the carburetor 18. The layout of the fuel tank 15 is not limited by the pressure-feed fuel system of the invention.

The cock 15d on the front wall of the fuel tank 15 is positioned directly behind the driver's seat 10. Therefore, the driver as seated on the driver's seat 10 can easily actuate the cock 15d for operating the fuel shut-down valve in the fuel tank 15.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A fuel supply system in an off-road vehicle including a vehicle frame, front and rear wheels mounted on front and rear portions of the vehicle frame and having wide tires, respectively, an engine mounted on the rear portion of the vehicle frame, and an exhaust pipe extending from the engine and disposed on one side of the engine transversely of the vehicle frame, said fuel supply system comprising:
   a fuel tank assembly disposed on the other side of said engine transversely of the vehicle frame and forwardly of a drive shaft of said rear wheels; and
   an air cleaner case disposed rearwardly of said fuel tank assembly ;
   said engine being disposed adjacent to said drive shaft of said rear wheels, and the vehicle frame comprises a pipe frame.

2. A fuel supply system according to claim 1, wherein said fuel tank assembly has a fuel inlet hole defined in a wall thereof and a cap for detachably closing said fuel inlet hole;
   said cap having a lock mechanism for locking said cap to said fuel tank assembly;
   said cap having an upper surface defining therein a key slot for insertion therein of a key for actuating and releasing said lock mechanism;
   said cap further including a cover swingably mounted on said upper surface of the cap for covering said key slot from above, and urging means for normally urging said cover resiliently into a position in which the cover covers said key slot ;
   said cap having a seal disposed on one side of said cover for sealingly engaging said upper surface of the cap at least around said key slot; and
   said seal having a projecting annular lip on its outer peripheral edge which sealingly contacts a ridge defined around the key slot.

3. A fuel supply system according to claim 1, wherein said fuel tank assembly comprises a main fuel tank disposed in a relatively low position in said vehicle frame and internally kept at a substantially atmospheric pressure level, and an auxiliary fuel tank disposed at a level higher than said main fuel tank and higher than a carburetor of said engine , the volume of the auxiliary fuel tank being extremely smaller than that of the main fuel tank;
   said fuel supply system further including:
   a fuel line interconnecting said main fuel tank, said auxiliary fuel tank and said carburetor of said engine; and
   a pump disposed in said fuel line interconnecting said main fuel tank and said auxiliary fuel tank for feeding fuel under pressure from said main fuel tank to said auxiliary fuel tank;
   the arrangement being such that the fuel fed from said main fuel tank to said auxiliary fuel tank by said pump is then fed by gravity to said carburetor.

4. A fuel supply system in an off-road vehicle including a vehicle frame, front and rear wheels mounted on front and rear portions of the vehicle frame and having wide tires, respectively, an engine mounted on the rear portion of the vehicle frame, and an exhaust pipe extending from the engine and disposed on one side of the engine transversely of the vehicle frame, said fuel supply system comprising:
   a fuel tank assembly disposed on the other side of said engine transversely of the vehicle frame and forwardly of a drive shaft of said rear wheels ; and
   an air cleaner case disposed rearwardly of said fuel tank assembly.

5. A fuel supply system according to claim 4, wherein said fuel tank assembly has a fuel inlet hole defined in a wall thereof and a cap for detachably closing said fuel inlet hole;

said cap having a lock mechanism for locking said cap to said fuel tank assembly;

said cap having an upper surface defining therein a key slot for insertion therein of a key for actuating and releasing said lock mechanism; and said cap further including a cover swingably mounted on said upper surface of the cap for covering said key slot from above, and urging means for normally urging said cover resiliently into a position in which the cover covers said key slot.

6. A fuel supply system according to claim 5, wherein said cap has a seal disposed on one side of said cover for sealingly engaging said upper surface of the cap at least around said key slot.

7. A fuel supply system according to claim 4, wherein said fuel tank assembly comprises a main fuel tank disposed in a relatively low position in said vehicle frame and internally kept at a substantially atmospheric pressure level, and an auxiliary fuel tank disposed at a level higher than said main fuel tank and higher than a carburetor of said engine;

said fuel supply system further including:

a fuel line interconnecting said main fuel tank, said auxiliary fuel tank and said carburetor of said engine; and a pump disposed in said fuel line interconnecting said main fuel tank and said auxiliary fuel tank for feeding fuel under pressure from said main fuel tank to said auxiliary fuel tank;

the arrangement being such that the fuel fed from said main fuel tank to said auxiliary fuel tank by said pump is then fed by gravity to said carburetor.

8. A fuel supply system in an off-road vehicle including a vehicle frame, front and rear wheels mounted on front and rear portions of the vehicle frame and having wide tires, respectively, an engine mounted on the rear portion of the vehicle frame, and an exhaust pipe extending from the engine and disposed on one side of the engine transversely of the vehicle frame, said fuel supply system comprising:

a fuel tank assembly disposed on the other side of said engine transversely of the vehicle frame; and an air cleaner case disposed rearwardly of said fuel tank assembly;

said vehicle further including:

a muffler coupled to a rear end of said exhaust pipe and disposed behind said engine; and a radiator disposed between said engine and said muffler longitudinally of said vehicle frame, between said exhaust pipe and said air cleaner case transversely of said vehicle frame, and upwardly of said engine and said muffler in the vertical direction.

9. A fuel supply system in an off-road vehicle including a vehicle frame, front and rear wheels mounted on front and rear portions of the vehicle frame and having wide tires, respectively an engine mounted on the rear portion of the vehicle frame, and an exhaust pipe extending from the engine and disposed on one side of the engine transversely of the vehicle frame, said fuel supply comprising:

a fuel tank assembly disposed on the other side of said engine transversely of the vehicle frame; and an air cleaner case disposed rearwardly of said fuel tank assembly;

said vehicle frame comprising a plurality of welded pipe members;

said fuel tank assembly comprising two tank members with respective flanges seam-welded to each other into an outer peripheral flange; and said outer peripheral flange being supported at plural locations thereon by at least two of said pipe members of said vehicle frame.

10. A fuel supply system in an off-road vehicle including a vehicle frame, front and rear wheels mounted on front and rear portions of the vehicle frame and having wide tires, respectively, an engine mounted on the rear portion of the vehicle frame, and an exhaust pipe extending from the engine and disposed on one side of the engine transversely of the vehicle frame, said fuel supply system comprising:

a fuel tank assembly disposed on the other side of said engine transversely of the vehicle frame; and an air cleaner case disposed rearwardly of said fuel tank assembly;

said vehicle frame comprises a plurality of pipe members;

said vehicle further having a driver's seat disposed substantially centrally in both the transverse and longitudinal directions of said vehicle frame; and said fuel tank assembly being disposed rearwardly of said driver's seat and having on a front wall thereof a cock positioned directly behind said driver's seat for permitting a driver to easily operate a fuel shut-off valve in said fuel tank assembly.

11. A fuel supply system in an off-road vehicle including a vehicle frame, front and rear wheels mounted on front and rear portions of the vehicle frame and having wide tires, respectively, an engine mounted on the rear portion of the vehicle frame, and an exhaust pipe extending from the engine and disposed on one side of the engine transversely of the vehicle frame, said fuel supply system comprising:

a fuel tank assembly disposed on the other side of said engine transversely of the vehicle frame; and an air cleaner case disposed rearwardly of said fuel tank assembly;

said fuel tank assembly having a fuel inlet hole defined in a wall thereof and a cap for detachably closing said fuel inlet hole;

said cap having a lock mechanism for locking said cap to said fuel tank assembly;

said cap having an upper surface defining therein a key slot for insertion therein of a key for actuating and releasing said lock mechanism; and said cap further including a cover swingably mounted on said upper surface of the cap for covering said key slot from above, and urging means for normally urging said cover resiliently into a position in which the cover covers said key slot.

12. A fuel supply system according to claim 11, wherein said cap has a seal disposed on one side of said cover for sealingly engaging said upper surface of the cap at least around said key slot.

13. A fuel supply system in an off-road vehicle including a vehicle frame, front and rear wheels mounted on front and rear portions of the vehicle frame and having wide tires, respectively, an engine mounted on the rear portion of the vehicle frame, and an exhaust pipe extending from the engine and disposed on one side of the engine transversely of the vehicle frame, said fuel supply system comprising:

a fuel tank assembly disposed on the other side of said engine transversely of the vehicle frame; and an air cleaner case disposed rearwardly of said fuel tank assembly;

said fuel tank assembly comprises a main fuel tank disposed in a relatively low position in said vehicle frame and internally kept at a substantially atmospheric pressure level, and an auxiliary fuel tank disposed at a level higher than the main fuel tank and higher than a carburetor of said engine;

said fuel supply system further including:

a fuel line interconnecting said main fuel tank, said auxiliary fuel tank and said carburetor of said engine; and a pump disposed in said fuel line interconnecting said main fuel tank and said auxiliary fuel tank for feeding fuel under pressure from said main fuel tank to said auxiliary fuel tank;

the arrangement being such that the fuel fed from the main fuel tank to the auxiliary fuel tank by said pump is then fed by gravity to said carburetor.

* * * * *

UNITED STATES PATENT AND TRADEMARK OFFICE
CERTIFICATE OF CORRECTION

PATENT NO. : 4,799,565

DATED : January 24, 1989

INVENTOR(S) : Akio HANDA et al

It is certified that error appears in the above-identified patent and that said Letters Patent is hereby corrected as shown below:

```
Column 1, line 24, correct the spelling of --relatively--;
         line 46, correct the spelling of --plurality--;
         line 52, change "is ridigity" to --in rigidity--.
Column 2, line 42, correct the spelling of --wheeled--;
         line 48, change "vehicles" to --vehicle--.
Column 6, line 22, before "engine" change "the" to --The--.
Column 8, line 11, change "as" to --has--.
Column 9, line 5, change "cove" to --cover--;
         line 26, change "fuel tank" to --pump--;
         line 27, change "pump" to --fuel tank--.
```

Signed and Sealed this

Ninth Day of January, 1990

*Attest:*

JEFFREY M. SAMUELS

*Attesting Officer*     *Acting Commissioner of Patents and Trademarks*